(12) United States Patent
Wömpner et al.

(10) Patent No.: US 7,874,412 B2
(45) Date of Patent: Jan. 25, 2011

(54) COMPOSITE PROFILE WITH A CARRIER BODY OF ALLOY MATERIAL AND A PROFILE STRIP AND A METHOD FOR PRODUCTION OF THE COMPOSITE PROFILE

(75) Inventors: Diethelm Wömpner, Bodman-Ludwigshafen (DE); Timo Netzel, Volkertshausen (DE)

(73) Assignee: Engineered Products Switzerland AG, Zurich (CH)

( * ) Notice: Subject to any disclaimer, the term of this patent is extended or adjusted under 35 U.S.C. 154(b) by 489 days.

(21) Appl. No.: 11/708,210

(22) Filed: Feb. 20, 2007

(65) Prior Publication Data

US 2007/0207633 A1    Sep. 6, 2007

(30) Foreign Application Priority Data

Mar. 2, 2006    (DE) ........................ 10 2006 009 604

(51) Int. Cl.
*B60M 1/00* (2006.01)
(52) U.S. Cl. ............................. 191/22 DM; 191/29 DM
(58) Field of Classification Search ............ 191/29 DM, 191/33 PM, 22 DM; 238/148; 104/306
See application file for complete search history.

(56) References Cited

U.S. PATENT DOCUMENTS 588,541 A *   8/1897 Walkins ..................... 191/22 C
3,917,039 A * 11/1975 Maitland ................ 191/29 DM
6,983,834 B1 *  1/2006 Kraudy ................... 191/22 DM

FOREIGN PATENT DOCUMENTS

| DE | 24 32 541 | 1/1976 |
| DE | 44 10 688 | 10/1995 |
| JP | 2-95939 | * 4/1990 |

OTHER PUBLICATIONS

U.S. Appl. No. 11/711,397, filed Feb. 27, 2007.*
U.S. Appl. No. 11/815,018, filed Jul. 30, 2007.*

* cited by examiner

*Primary Examiner*—Mark T Le
(74) *Attorney, Agent, or Firm*—Bachman & LaPointe, P.C.

(57) ABSTRACT

A composite profile comprising: (1) an extruded metal alloy carrier profile comprising a rail head having a longitudinal axis B, the rail head comprises a surface and two longitudinal edges extending parallel to the longitudinal axis B and (2) a metal channel shaped profile strip comprising a base portion spanning the surface of the rail head and parallel side legs which lie on the longitudinal edges of the head rail, an insert rod is provided on the parallel side legs which lie on the longitudinal edges of the head rail and engage in lateral slots provided in the two longitudinal edges of the rail head, wherein the profile strip is attached to the carrier profile under mechanical pretension by way of a weld scan.

13 Claims, 6 Drawing Sheets

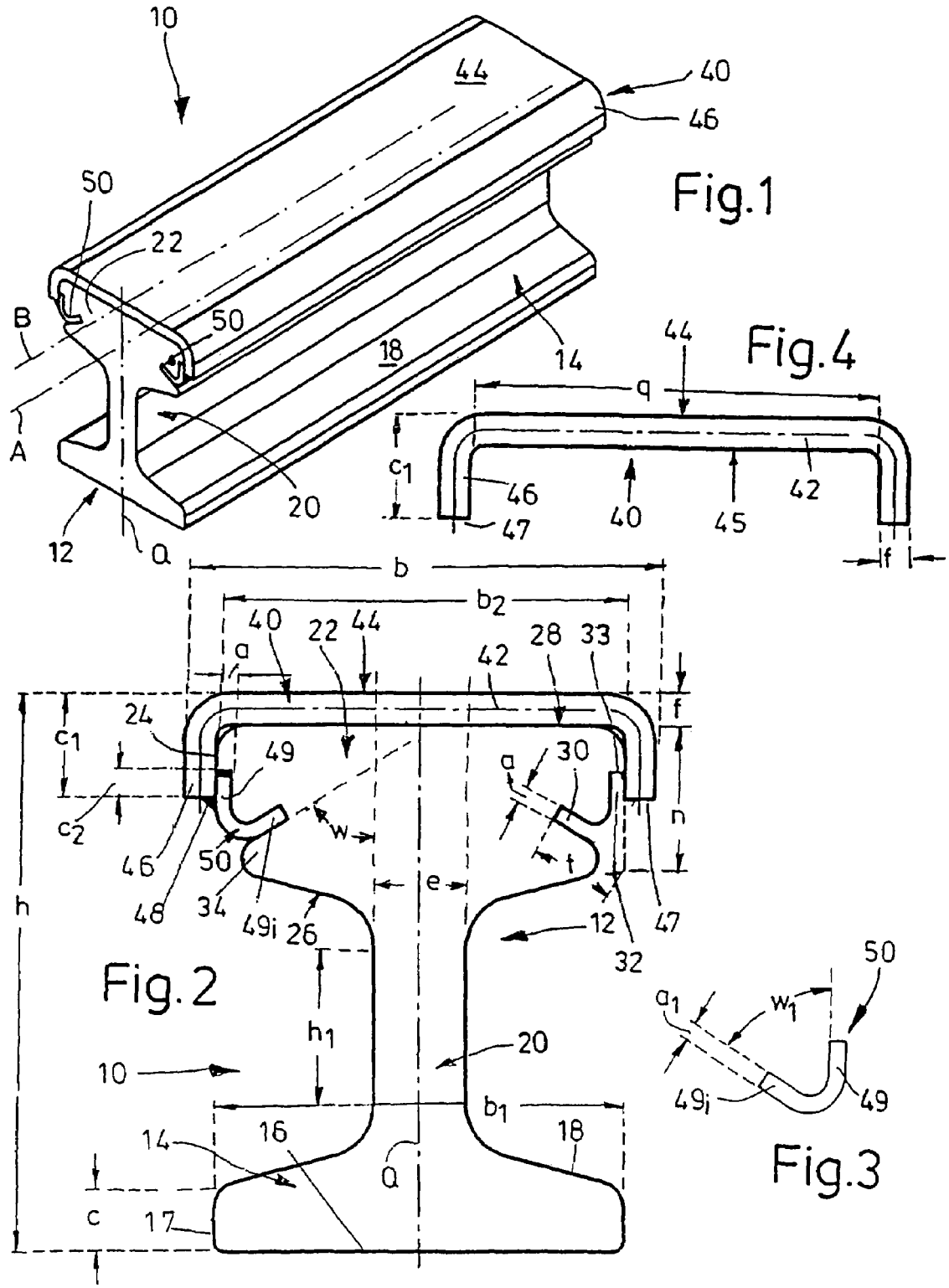

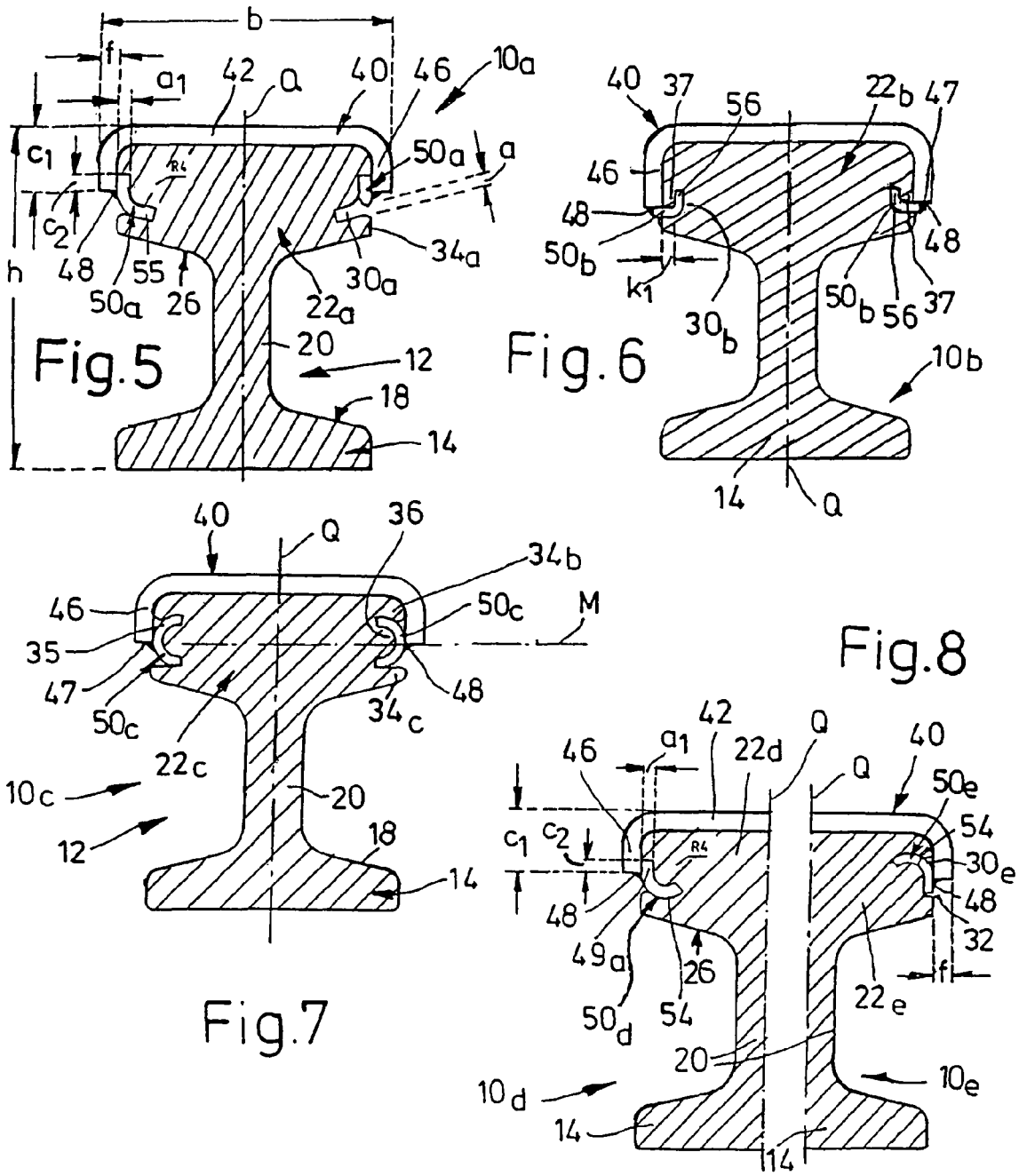

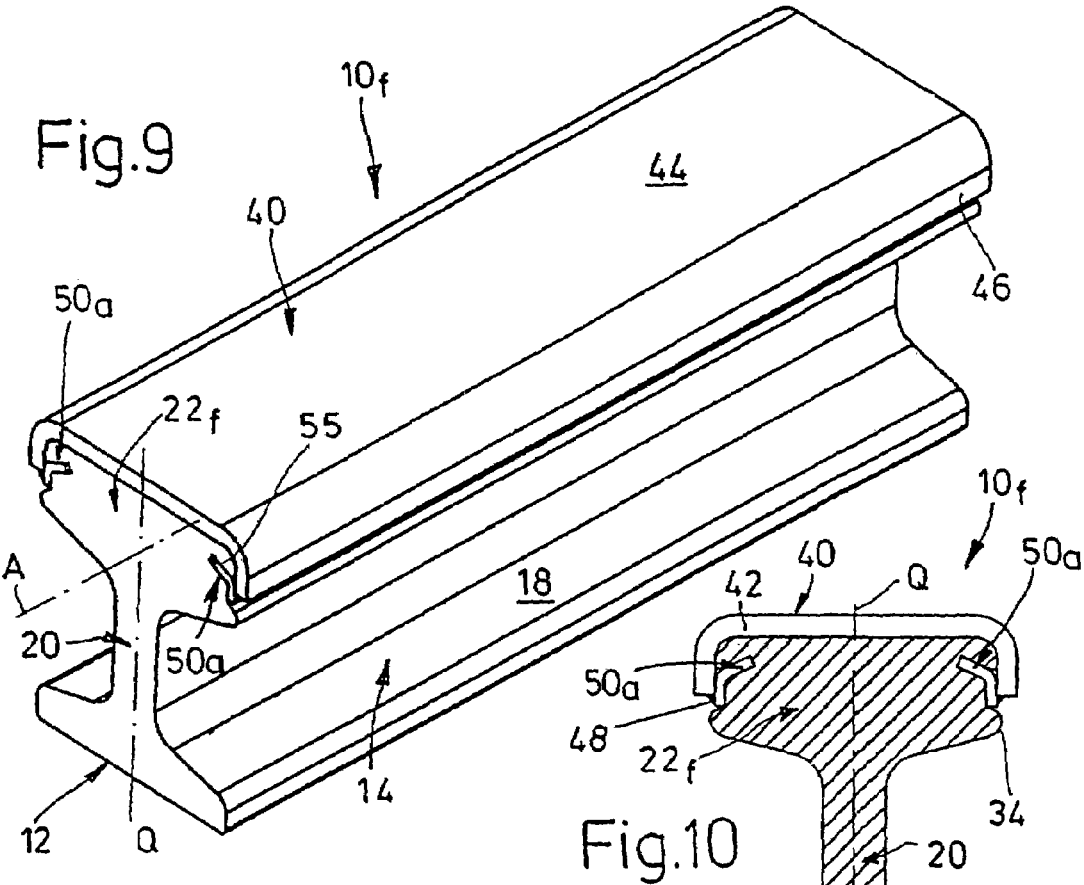
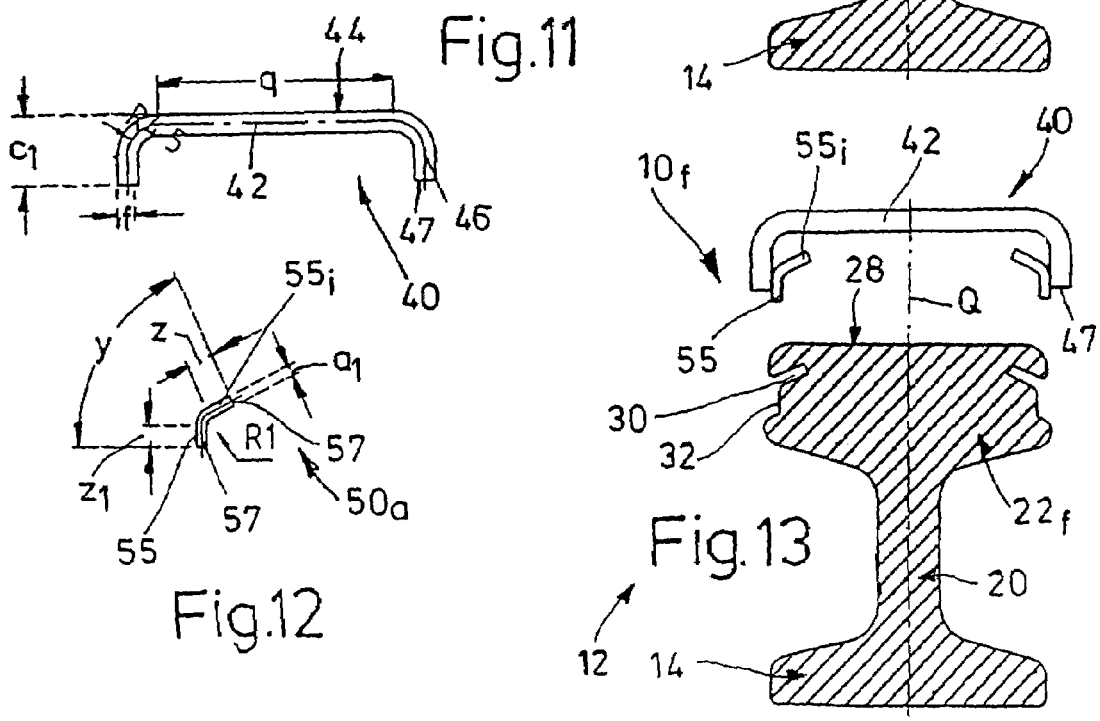

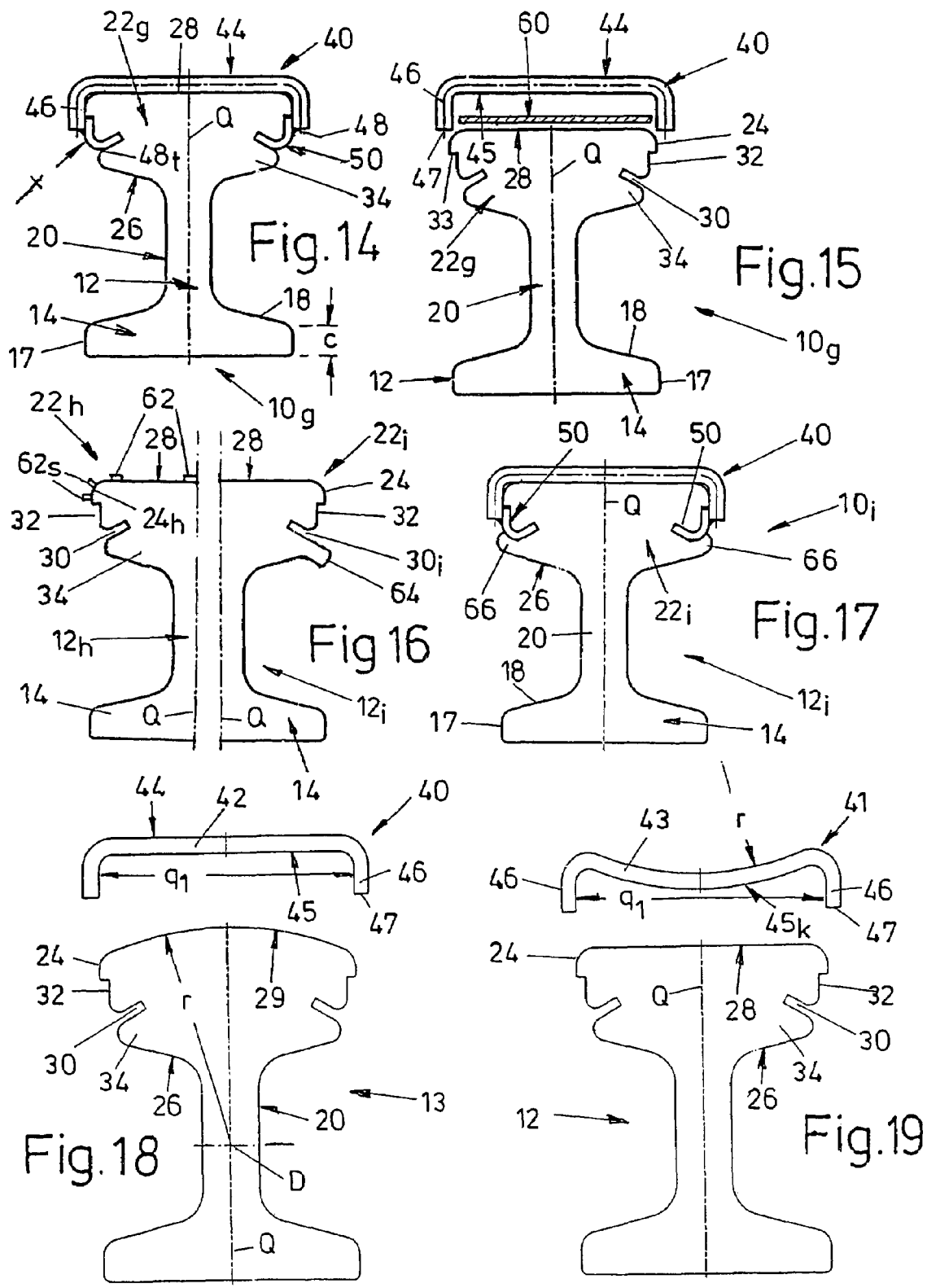

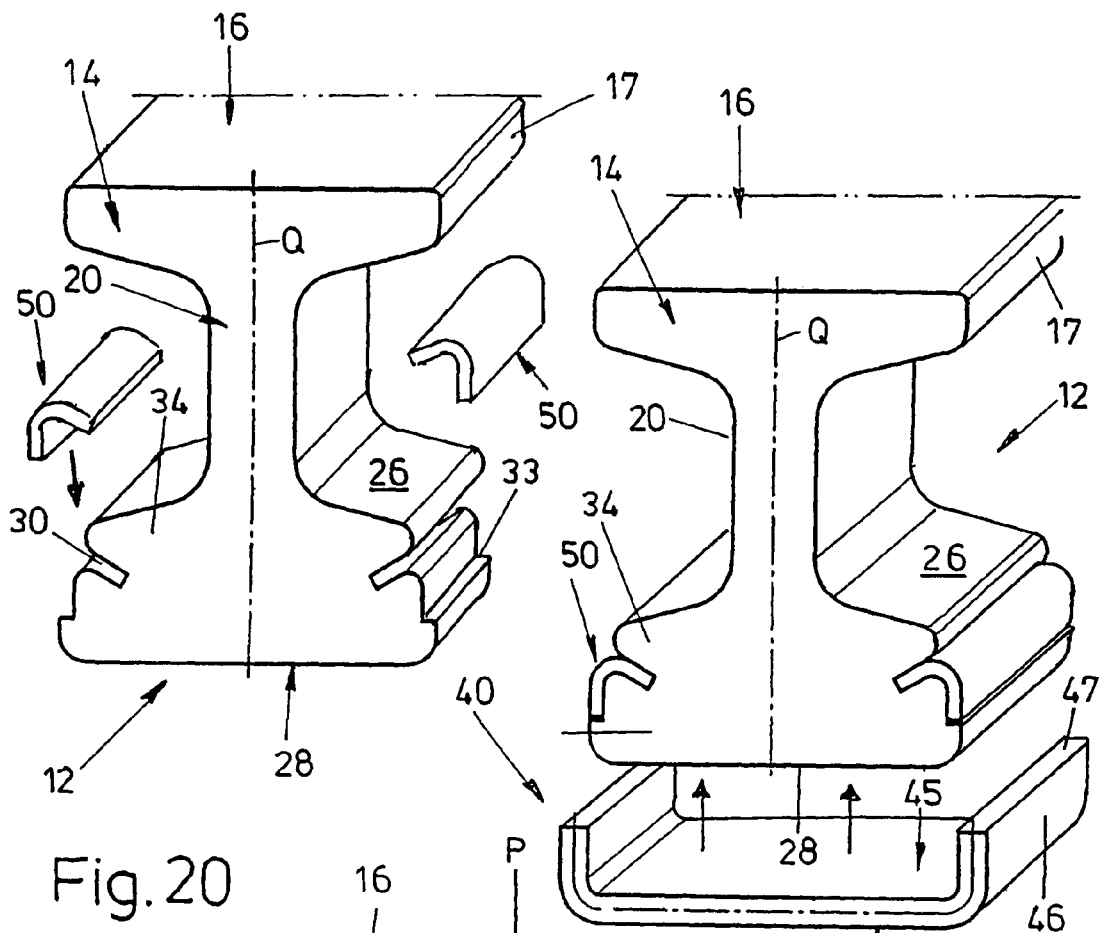
Fig. 20
Fig. 21
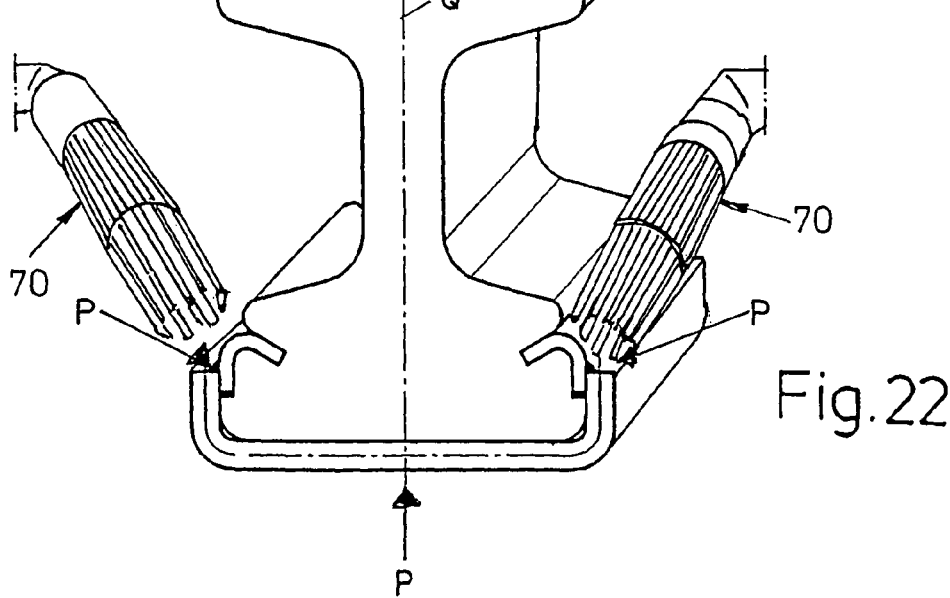
Fig. 22

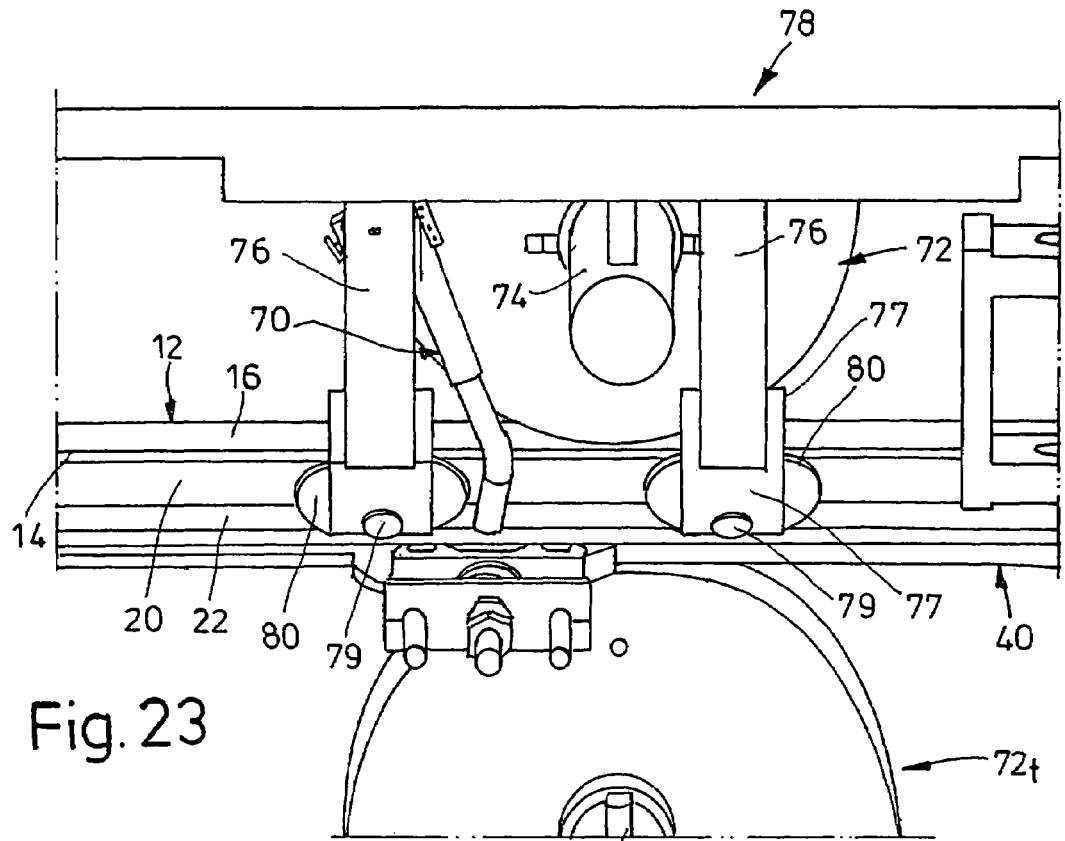
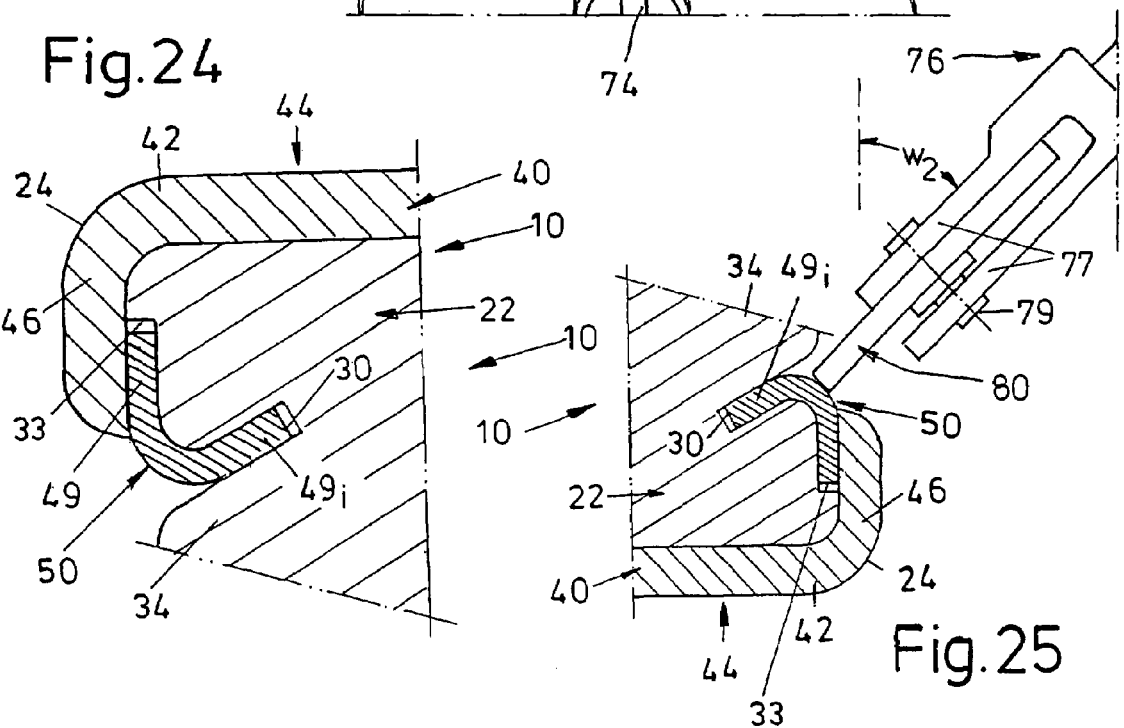

COMPOSITE PROFILE WITH A CARRIER BODY OF ALLOY MATERIAL AND A PROFILE STRIP AND A METHOD FOR PRODUCTION OF THE COMPOSITE PROFILE

CROSS REFERENCE TO RELATED APPLICATIONS

This application is related to U.S. application Ser. No. 11/711,397 filed Feb. 27, 2007, now U.S. Pat. No. 7,712,591, and U.S. application Ser. No. 11/815,018 filed Jul. 30, 2007.

BACKGROUND OF THE INVENTION

The invention concerns a composite profile with a rail-like carrier body extrusion-moulded from alloy material, and spanning its head surface a profile strip of a harder metal. The invention also concerns a method for production of such a composite profile.

DE 24 32 541 A1 describes a method for production of conductor rails from a carrier profile and at least one support, forming at least part of the surface of the carrier profile serving as the conductor rail, of a profile strip of another metal as a cover profile of higher abrasion resistance. During the extrusion moulding process the carrier profile is created from a block by means of extrusion through a moulding cross-section of an extrusion die and at the same time the profile strip runs parallel to the die longitudinal axis through the die opening or moulding cross-section. During the extrusion process, an internal metallic connection is formed between the two profile components. For example, on use of the conductor rail for electrification of rail vehicles, in cases of particularly high load, despite the inner metallic connection, in the long term the profile strip detaches from its carrier profile of alloy.

DE 44 10 688 A1 discloses a composite profile with a carrier profile of alloy and connected with this a profile strip. The latter spans the surface of a rail head of the carrier profile, is formed channel-like in cross section and in its side legs that protrude from the inner surface on the carrier body side at a distance from each other, has recesses which are embedded in the carrier body. These recesses delimit undercut cavities which are filled form-fit with the metallic material of the carrier body. This form-fit connection does not have the defects described in relation to the metallic connection.

A composite conductor rail element for power supply of a rail vehicle with a cover of a material of high mechanical resistance that is attached rigidly to a rod of electrically conductive material and forms the slide or contact surface for current pick-up of the vehicle, is disclosed in DE 25 46 026 A1. The cover is fixed to the conductive rod serving as the carrier in that the edges of the cover are clamped or crushed into the conductive rod. The result is at least one constriction, running in the longitudinal direction, in the cover which penetrates into the conductive rod. For clamping the edges of the cover, a groove is provided in the conductive rod which delimits a lip. The latter leads to the clamping of the cover on the conductive rod as soon as it is at least partly folded back and pressed against the edge of the cover.

Conductor rails on which their wearing components are attached to the conductive carrier profile by lateral through bolts or additional push elements have proved disadvantageous. Other known production methods can disadvantageously lead to corrugation on the surface of the cover profile which is caused by the stepped caulking or punching of the carrier profile.

In the knowledge of this prior art, the inventors have faced the task of largely improving the connection between the carrier profile and the profile strip while largely retaining the possibility of particularly economic production.

SUMMARY OF THE INVENTION

This object is achieved by providing a composite profile with a carrier profile extrusion-moulded from alloy material, and spanning its head surface a profile strip of a harder metal, characterised in that on the profile strip lying approximately on the head or surface of the carrier profile, on each long side parallel to its longitudinal axis (B) is attached an insert rod which on the other side engages in a lateral slot of the carrier profile, and is connected with its profile strip by way of a weld seam, wherein the channel-like profile strip with its anchor or insert rod is attached to the carrier profile under mechanical pretension.

According to the invention, on the profile strip or cover profile lying on the head or surface of the carrier profile and preferably made of special steel, on each long side is attached an anchor or insert rod parallel to the longitudinal axis of the profile strip, which anchor or rod on the other side engages in a side slot of the carrier profile and is connected with its profile strip by a weld seam; the channel-like profile strip with its anchor or profile rod is joined to the carrier profile generating a mechanical pretension which guarantees a permanently firm seat. The insert rod or profile is preferably made of the material of the profile strip, supplements the profile strip on both sides and thanks to the welded connection give secure protection for the internal surface of the conductive carrier profile.

With a profile strip formed channel-like that lies on the rail head of a rail-like carrier profile, it has proved favourable to connect the insert rod with a side leg of the profile strip, and on the other side insert this with at least one rod section protruding from that side leg in a correspondingly arranged slot of the carrier profile; that rod section runs at an angle to the cross-sectional axis of the carrier profile and thus generates the pretension according to the invention.

A channel-like insert rod of approximately V-shaped cross-section is preferred which lies with one channel leg on the inside of the side leg on the profile strip approximately axially parallel; the other channel leg is then directed towards the longitudinal axis of the profile strip and is mounted in a slot which is tilted at an angle to the cross-sectional longitudinal axis of the carrier profile. In this embodiment the cross-section of the slot in the rail head of the carrier profile is itself V-shaped, where the slot leg running in the side and longitudinal surface of the rail head is formed by a longitudinal recess. That angle preferably measures 60° to 70°, in particular 65°.

Another insert rod according to the invention is of angular cross-section and lies with one channel leg on the inside of the side leg; the other channel leg is tilted away from or alternatively towards the base plate of the profile strip. Here the angle which is delimited by the two channel legs should measure more than 90°, preferably around 110°.

The invention also extends to an insert rod with approximately semi-circular cross section which at the zenith of its curvature is welded with the outer face on the edge of the face of the side leg of the profile strip, so that the two insert rods of the profile strip are arranged on a common centre axis and open towards each other. This centre axis crosses the cross-sectional axis of the composite profile which in turn is parallel to its side surfaces. Also, the centre axes of the insert rods in each of the two long faces of the rail head determine the position of a bead, the cross-section of which is adapted to the form of the interior of the insert rod which is to be joined to it and which on both sides is limited by an insert slot for the free edge of the insert rod tilted to the centre axis.

The cross-section of another embodiment of the insert profile or rod according to the invention for the rail head comprises a quarter-circle section and a linear section, where the latter lies on the side leg of the profile strip on the inside and is welded to its face. These quarter-circle sections of the two insert rods can be oriented towards or away from the base plate of the profile strip. The slot of the rail head for the linear section of the insert rod should here contain a longitudinal recess in the long face of the rail head. Also, it must be ensured that the pairs of similarly shaped insert rods offer the same design in a mirror image.

In another feature of the invention an insert rod with a hook-like cross-section, with free hook section running at a distance from the side leg and directed towards the base plate of the profile strip, is welded at the other end to the face of the side leg.

It has also proved favourable to allow the slot-like recess in the rail head to be undercut by a longitudinal rib attached at a distance from the surface of the rail head and limited by the underside of the rail head.

In an alternative embodiment to the arrangement, described in more detail above, of the insert rod of hook-like cross section with free hook section running at a distance from the inner face of the side leg of the profile strip, said section points away from the base plate of the profile strip i.e. towards the foot area of the composite profile. This insert rod too is welded to the face of the side leg.

Another embodiment comprises an insert rod of stepped cross-section which at one end is welded to the inner face of the profile strip side leg and at the other end undercuts with its free hook end a peg strip in the long face of the rail head.

The scope of the invention also contains insert rods of linear cross-section, i.e. strip-like, which on the inside lie on the side legs of the profile strip and project over its side face with which they are connected by means of a through weld seam. This insert rod according to the invention is tilted towards the cross-sectional longitudinal axis of the composite profile at an angle of around 60° to 80°, preferably 70° to 75°.

In a further embodiment according to the invention, one of the two opposing surfaces of carrier profile and cover profile are curved in cross-section to its partner, which gives the required pretension.

The invention also comprises a method for production of a composite profile in which a carrier profile made of alloy material is extrusion-moulded with a head surface and insert slots accompanying this on both sides, where an insert rod in inserted in each slot and on each section of the insert rod protruding from the slot is laid a profile strip encompassing the head surface such that this cover profile has a pretension in relation to the carrier profile.

The insert rod is welded to the profile strip throughout.

First therefore the anchoring strips, anchor rods or insert rods are inserted or pressed or rolled into the alloy profile, in particular into a base Al profile, or before welding or afterwards fixedly rolled or pressed by residual deformation of the carrier profile. It must be ensured here that the pretension between the partners is created. With the help of a contact roller of large diameter, the special steel cover profile is pressed onto the alloy carrier profile and under this pretension the anchoring strips or insert rods are welded with the cover profile on the right and left simultaneously.

Also, the cover profile is preferably a special steel strip cut from a roll coil which is brought to the desired form by rolling or is used directly as a cut strip. The insert rod is a special steel strip—preferably of the same alloy as the cover profile—which advantageously is cut from the roll coil and brought to the desired form by rolling/trimming/flanging/edging.

In order to eliminate the defects cited initially, a continuously running composite profile—in the manner of extrusion moulding for the carrier profile and roll forming—is proposed over the entire profile length of cover profile and insert rods or anchoring profiles. The connection is achieved by continuous welding over the profile length.

The maximum possible width of the grinding surface is required with the possibility of coating from the side and mechanical anchoring which guarantees an anchoring of the then two residual grinding surfaces even when the wear profiles are fully worn. Also, a reduction in the installation height tolerance in comparison with known composite profiles is desired. Also desirable are local production facilities worldwide without having to re-equip a large alloy extrusion press.

BRIEF DESCRIPTION OF THE DRAWINGS

Further advantages, features and details of the invention arise from the description below of preferred embodiment examples and with reference to the drawing which shows:

FIG. 1, 9 each a perspective view onto a section of a rail-like composite profile of two composite partners in the form of a rail profile with cover profile;

FIG. 2 the enlarged front view of the composite profile of FIG. 1 with a component removed from the composite profile;

FIG. 3 the component removed from FIG. 2 in the form of an insert rod,

FIG. 4 the front view of the cover profile used as a composite partner in FIG. 1;

FIGS. 5, 6, 7 each a cross-section reduced in relation to FIG. 2 through a composite profile of another design;

FIG. 8 two halves of the cross-sections of two different composite profiles;

FIG. 10 the cross-section through the composite profile in FIG. 9;

FIG. 11 the front view of the cover profile used as a composite partner in FIG. 9;

FIG. 12 the front views of an insert rod or profile for FIG. 9, 10;

FIG. 13 the two composite partners of FIG. 10—rail profile and cover profile—before assembly;

FIG. 14 the front view of a composite profile corresponding approximately to FIG. 2 and comprising two composite partners;

FIG. 15 the composite profile of FIG. 14 before assembly;

FIG. 16 two halves of the cross-sections of two different rail profiles, wherein the right figure half is allocated to FIG. 17;

FIG. 17 the front view of the right rail profile of FIG. 16 after assembly with the other composite partner;

FIG. 18, 19 each a front view of two further composite profiles before assembly;

FIG. 20 to 22 sketches of the production steps for the conductor rail;

FIG. 23 a sketch in oblique view of a section of a conductor rail during the production process;

FIG. 24 an enlarged fragment of the conductor rail in FIGS. 3, 14;

FIG. 25 the fragment in FIG. 24 on reduced scale during the production process.

DETAILED DESCRIPTION

A composite profile 10 of height h of here for example 105 mm and the maximum width b of 92 mm has in FIG. 1 a rail-like carrier profile 12 with a rail foot 14 and an extrusion-like rail head 22 attached thereto by means of a rail web 20. Two long edges 17 of height c of 10 mm limiting the foot surface 16 of the rail foot 14 run parallel to each other at a distance $b_1$ of here 80 mm. The dimensions given are established over approximately 70% of the present composite profile 10; the general dimension ranges are measured approximately as follows:

Profile height h: 50 mm to 150 mm
Profile width b: 60 mm to 160 mm
Rail foot width $b_1$: 30 mm to 130 mm.

Of these long edges 17, the two roof surfaces 18 of the rail foot 14 which are slightly tilted towards each other are slightly tilted upwards to the cross-sectional centre axis Q crossing the longitudinal axis A of the composite profile 10 and transform into the axial rail web 20 of height $h_1$ of around 30 mm and thickness e of around 18 mm. At the upper end of the rail web 20 they are connected to the long edges 24 of the rail head 22, the width $b_2$ of which measures around 78 mm and the external height n of which, of around 28 mm, determines the position of the rail head surface 28.

From each of the long edges 24 of the rail head 22 in FIG. 1, 2 starts a slot 30 which is tilted upwards to the cross-sectional longitudinal axis Q at an angle w of around 60° and of width a here 4 mm and depth t 18 mm, the lower wall face of which slot in FIG. 2 transforms into a type of longitudinal rib 34 of the rail head 22, the outside of which is formed by the under face 26. Produced in the long edge 24, forming a cross-sectional step 33, is a longitudinal recess 32 as a physical extension of the slot 30 of V-shaped cross-section which also gives its width a.

This rail or carrier profile 12 of the composite profile 10 is formed from an alloy material in an extrusion die which is not shown in the drawing for reasons of clarity.

The flat head or surface 28 of the rail profile 12 or its rail head 22 is spanned in the end state by a profile strip 40 of thickness f of 6 mm which is made of a ferrous or non-ferrous metal. This profile strip 40 is channel-like in cross-section and its side legs 46 of height $c_1$ of 20 mm, starting from a base plate 42 and parallel to each other and to the longitudinal axis B of the profile strip 40, lie on the long edges 24 of the rail head 22. In this position the flat outer surface 44 of width q of the profile strip 40 forms the surface of the composite profile 10.

Allocated to each side leg 46 of the profile strip 40 lying on the surface 28 of the rail head 22, in the embodiment example of FIG. 1, 2 on the inside, axially parallel, is a channel-like insert rod 50 of approximately V-shaped cross-section with opening angle $w_1$ of approximately 65°, whose channel legs 49, $49_1$ of linear cross-section have a thickness $a_1$ which corresponds with slight play to the width a of the slot 30. The right channel leg 49 in FIG. 3 of the insert rod 30, also called an anchor rod, lies with its outside—running parallel to the cross-sectional longitudinal axis Q—on the inside of the side leg 46 of the profile strip 40 in a contact width $c_2$ of 5 mm and is welded tightly to this with a weld seam indicated at 48. This runs on the face 47 of the profile strip side leg 46. The other channel leg $49_i$ is inserted in the adjacent slot 30 of the rail head 22. This gives a permanent and tight connection under mechanical pretension of the two composite partners 12, 40 of the composite profile 10. This pretension between the composite partners determines their suitability for use; since this pretension is a requirement for the transition resistances, corrosion behaviour and hence life of the power transmission system.

The rail head $22_a$ of the composite profile $10_a$ in FIG. 5, instead of a V-shaped slot, has a slot $30_a$ of bent angular cross-section of width (radius) 4 mm for a correspondingly formed insert rod $50_a$ of the profile strip 40 which is designed in itself according to FIG. 2, 4. Towards the rail foot 14, the slot $30_a$ is limited by an upwardly tilted longitudinal rib $34_a$ of the rail head $22_a$. This slot $30_a$ holds the free end 55 of the curved cross-section of the insert rod $50_a$ which in side view is a longitudinal strip.

FIG. 6 shows two insert profiles or insert rods $50_b$ of angular or hook-like cross-sectional form for corresponding slots $30_b$ in the rail head $22_b$ or composite profile $10_b$. These insert rods $50_b$ are welded to the face 47 of the profile strip side leg 46 by a weld seam 48 and with their free hook section 56 undercut an axially parallel peg strip 37 of width $k_1$ of the rail head $22_b$.

The profile strip 40 of FIG. 7 is designed largely corresponding to that in FIG. 2, 4; in this composite profile $10_c$ however the two insert profiles or insert rods $50_c$ are bent semi-circular in cross-section and at their zenith are each welded to the face 47 of a side leg 46 of the profile strip 40. The insert rods $50_c$ opening to each other in a centre axis M crossing the cross-section longitudinal axis Q, surround at the rail head $22_c$ a bead 36 of part-circular cross-section contour which is limited on both sides by longitudinal ribs $34_c$ forming insert slots 35 for the cross-section ends of the insert rod $50_c$.

FIG. 8 in each case shows one half, ending in cross-sectional longitudinal axis Q, of two composite profiles $10_d$, $10_e$; the other halves which are not shown are designed accordingly. Allocated to the profile strip 40 of the embodiment on the left in FIG. 8 is an insert rod $50_d$ of thickness $a_1$, the cross-section of which comprises a quarter-circle section 54 and a linear section $49_a$ which is welded to the corresponding side leg 46 of the profile strip 40. This quarter-circle cross-section 54 protrudes towards the rail foot 14. In the embodiment on the right in FIG. 8, the insert rod $50_e$ is established so that the quarter-circle section 54 is directed towards the base plate 42 of the profile strip 40. In both composite profiles $10_d$, $10_e$ the linear section rests in a longitudinal recess 32 of the rail head $22_d$ or $22_e$ which transforms into a slot $30_e$ of curved cross-section.

The composite profile $10_f$ in FIGS. 9 to 13 contains two insert rods $50_a$, the form of which is described for FIG. 5. In contrast to that depiction however the free ends 55 of the insert rods $50_a$ here point upwards, i.e. towards the base plate 42 of the profile strip 40.

FIG. 11 shows for better clarity, adjacent, the precise structure of this profile strip 40 already described for FIG. 4, wherein the width q of its straight outer face 44 here measures 68 mm with an elongated length of around 116 mm and a surface of around 697 mm [mat. 1.4016 (X 6 Cr 17) with 5373.1 g/m].

The insert rod 50a according to FIG. 12, with faces 57 of its two profile legs 55 and $55_i$ of length z of 7.8 mm and $z_1$ of 5.8 mm respectively, determines an angle y of 65°. FIG. 13 shows the length of the slot 30 described above and the longitudinal recesses 32 in the rail head $22_f$.

In the embodiment examples described, the head surface 28 of the rail profile 10, $10_a$ to $10_f$ and/or the under face 45 of the cover profile 40, for the sake of better holding and electrical contact, are brushed, blasted, galvanically coated or silver-coated.

The composite profile $10_g$ of FIG. 14, 15 corresponds in its structure to the composite profile 10 of FIG. 1, 2 with the evident difference that the insert rods 50 are each attached both by the weld seam 48 to the face edge 47 of the side leg 46 of the cover profile 40 and also on the other side by a solder or solder weld seam $48_t$ to the longitudinal rib 34 of the rail head $22_g$. This solder or solder weld seam $48_t$ ensures an improvement in the transition resistance and protects against water penetration. Also arrow x in FIG. 14 shows the impact direction for a tool wedge which is not shown with which a caulking force is applied to the insert rod 50.

On the finished composite profile $10_g$ it is no longer evident that between the head face 28 of the rail head 22 and the under face 45 of the cover profile 40, to improve contact, a film 60 or corresponding layer of contact grease is applied. The film 60 can be a soft pure aluminium film or a solder film or a graphite film and sits firmly between the two faces 28, 45.

From the head face 28 of the rail head $22_h$ of a rail profile $12_h$ of a further design which is sketched only in half in FIG. 16, protrude longitudinal webs or web attachments 62; in addition or also alone corresponding web attachments $62_s$ can protrude from the long edge $24_h$ of curved cross-section of the rail head $22_h$. These web attachments 62, $62_h$ which are produced on extrusion-moulding of the rail head $22_h$ centrally on the carrier profile $12_h$, on the side areas of the head face 28 and long edges $24_h$, are deformed on application of the profile strip or cover profile 40 and generate a pretension in the system.

The rail profile $12_i$ indicated on the right in FIG. 16 differs from the rail profile 12 in FIG. 14, 15 by a lip web 64 that is attached to the rail head $22_i$ as a type of underlip during the extrusion-moulding process and extends the lower faces of the slot $30_i$; after application of the insert rod 50, this lip web 64 is deformed, creating a support, into the pressure beads 66 by means of pressure rolling carried out along the composite profile $10_i$ according to FIG. 17.

FIGS. 18, 19 depict two further possibilities for generating a pretension between the head face of the rail profile and the under face of the profile strip or cover profile, namely firstly a ball-shaped head face 29 of a rail profile 13, which head face opposes the flat under face 45 of the cover profile 40 and is curved about an attachment point D preferably lying in the rail web 20 and the cross-sectional longitudinal axis Q. Secondly, FIG. 19 shows a base plate 43, which is curved towards the flat head face 28 of the fail foot 12, of a profile strip or cover profile 41; the dimensions of curvature of this and its under face $45_k$ running symmetrical to the cross sectional longitudinal axis Q corresponds, in inverse curvature direction, to that of the curved head face 29 described in FIG. 18, i.e. its radius r corresponds to that of FIG. 19. The inner distance $q_1$ of the side leg 46 of the flat cover profile 40 also corresponds to the inner distance $q_1$ of the side leg 46 of the curved cover profile 41.

FIGS. 20 to 23 and 25 show the production method according to the invention. First the two insert rods 50 of special steel are supplied to the extruded rail profile 12 according to FIG. 20 and their inner channel-like legs $49_i$ inserted in the respective slots 30. Then all special steel profiles are applied, i.e. the insert rods 50 and cover profile 40, the latter on the head face 28 of the rail or carrier profile 12 (FIG. 21). Then these parts are welded under pressure P; the weld nozzles used are referenced 70.

On a lower contact roller $72_t$ according to FIG. 23 lies the unit of cover profile 40 and rail profile 12, to which are allocated—not shown—the two insert rods 50. An upper contact roller 72 is allocated to the foot surface 16 of the rail foot 14. These special rollers 72, $72_t$ which are adapted and mounted on parallel shafts 74, exert the necessary vertical pressure, whereas on both sides, on lateral mounting arms 76 of a roof frame 78 each between a pair of bearing plates 77 which are arranged tilted at an angle $w_2$ of for example 45°, pressure plates 80 which are rotatable on a pulley shaft 79 exert a contact pressure on the insert rods 50 and hold these in the slots 30 of the rail head 22. This is a modified roll straightening machine for alloy profiles. In order to achieve an optimum pretension, welding is performed between the contact rollers 72, $72_t$ of antimagnetic material, and the two sides are processed simultaneously.

FIG. 24 shows a substantial fragment of the conductor rail 10 according to the invention which offers the required pretension. A corner area of the rail head 22 with slot 30 is evident, as is a channel-like insert rod 50 held therein which on the other side ends at the cross-sectional step 33 of the longitudinal recess 32 of the rail head 22 and is attached to the side leg 46 of the profile strip or cover profile 40.

The invention claimed is:
1. A composite profile comprising:
(1) an extruded metal alloy carrier profile comprising a rail head having a longitudinal axis B, the rail head comprises a surface and two longitudinal edges extending parallel to the longitudinal axis B and (2) a metal channel shaped profile strip comprising a base portion spanning the surface of the rail head and parallel side legs which lie on the longitudinal edges of the head rail, an insert rod is provided on each of the parallel side legs which lie on the longitudinal edges of the head rail and engage in lateral slots provided in the two longitudinal edges of the rail head, wherein a top surface of the carrier profile is curved semicircular in cross-section and its zenith is arranged at a cross-sectional longitudinal axis (Q) opposite a flat under face of the profile strip such that in an assembled arrangement of the profile strip and the carrier profile with a weld scan, a mechanical pretension is generated, and wherein, the insert rod is of approximately V-shaped cross-section that comprises one channel leg overlapping a significant portion of a vertical inside face of the side leg of the profile strip approximately axially parallel and another channel leg which is directed towards the longitudinal axis (B) of the rail head is mounted in the slot tilted at an angle (w) to the cross-sectional longitudinal axis (Q) of the carrier profile.

2. A composite profile comprising:
(1) an extruded metal alloy carrier profile comprising a rail head having a longitudinal axis B, the rail head comprises a surface and two longitudinal edges extending parallel to the longitudinal axis B and (2) a metal channel shaped profile strip comprising a base portion spanning the surface of the rail head and parallel side legs which lie on the longitudinal edges of the head rail, an insert rod is provided on each of the parallel side legs which lie on the longitudinal edges of the head rail and engage in lateral slots provided in the two longitudinal edges of the rail head, wherein a surface of the carrier profile is flat and an under face of the profile strip is convexly curved towards the carrier profile and symmetrical to a cross-sectional longitudinal axis (Q) such that in an assembled arrangement of the profile strip and the carrier profile with a weld scan, a mechanical pretension is generated, and wherein, the insert rod is of approximately V-shaped cross-section that comprises one channel leg overlapping a significant portion of a vertical inside face of the side leg of the profile strip approximately axially parallel and another channel leg which is directed towards the longitudinal axis (B) of the rail head is mounted in the slot tilted at an angle (w) to the cross-sectional longitudinal axis (Q) of the carrier profile.

3. A composite profile according to claim 1 or 2, wherein the metal of the profile strip is made of steel and is harder than the metal alloy of the carrier profile.

4. A composite profile according to claim 3, wherein the insert rod is formed from the material of the profile strip.

5. A composite profile according to claim 1 or 2, wherein the lateral slots are tilted towards the rail head and the cross-sectional longitudinal axis (Q) of the carrier profile.

6. A composite profile according to claim 5, wherein the slot comprises a V-shaped cross-section in the rail head of the carrier profile, wherein one of the slot legs is a longitudinal recess in the longitudinal edge of the rail head.

7. A composite profile according to claim 6, wherein the longitudinal recess ends at a radial cross-sectional step.

8. A composite profile according to claim 6, wherein the angle (w) 60° to 70°.

9. A composite profile according to claim 1 or 2, wherein the insert rod is of linear cross-section which lies on the inside of the profile strip side leg and protrudes beyond its face, where at one end it is welded to the face of a profile side leg and is tilted in relation to a cross-section longitudinal axis (Q) of the composite profile at an angle (w) of around 60° to 80°.

10. A method for production of the composite profile according to claim 1 or 2, including providing the carrier profile with the head surface and the side slots accompanying on both sides, and inserting in each side slot the insert rod and on a section of the insert rod protruding from the slot lies the profile strip or cover profile encompassing the head surface so that the cover profile has a pretension in relation to the carrier profile.

11. A method according to claim 1 or 2, wherein the insert rod is fixedly rolled or pressed onto the carrier profile with pretension.

12. A method according to claim 1 or 2, wherein the profile strip is pressed onto the carrier profile with pretension.

13. A method according to claim 1 or 2, wherein the insert rod is through welded with the profile strip.

\* \* \* \* \*